US 8,254,307 B2

(12) United States Patent
Heller

(10) Patent No.: US 8,254,307 B2
(45) Date of Patent: Aug. 28, 2012

(54) METHOD AND APPARATUS FOR IMPROVING UTILIZATION EFFICIENCY OF WIRELESS LINKS FOR WEB-BASED APPLICATIONS

(75) Inventor: Howard A. Heller, Indialantic, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 398 days.

(21) Appl. No.: 11/228,838

(22) Filed: Sep. 16, 2005

(65) Prior Publication Data

US 2006/0007902 A1    Jan. 12, 2006

Related U.S. Application Data

(63) Continuation of application No. 09/876,843, filed on Jun. 6, 2001, now Pat. No. 6,947,444.

(51) Int. Cl.
*H04Q 7/00* (2006.01)
*H04L 12/28* (2006.01)

(52) U.S. Cl. ......................................... 370/328; 370/401

(58) Field of Classification Search .................. 370/328, 370/338, 401, 466; 455/560
See application file for complete search history.

(56) References Cited

U.S. PATENT DOCUMENTS

| | | | |
|---|---|---|---|
| 5,930,472 A | 7/1999 | Smith | |
| 6,374,079 B1 | 4/2002 | Hsu | |
| 6,388,999 B1 | 5/2002 | Gorsuch et al. | |
| 6,418,324 B1 | 7/2002 | Doviak et al. | |
| 6,438,125 B1 * | 8/2002 | Brothers | 370/352 |
| 6,542,481 B2 | 4/2003 | Foore et al. | |
| 6,587,684 B1 | 7/2003 | Hsu et al. | |
| 6,591,288 B1 | 7/2003 | Edwards et al. | |
| 6,601,090 B1 * | 7/2003 | Gurijala et al. | 709/213 |

(Continued)

OTHER PUBLICATIONS

Third Generation Partnership Project, "Technical Specification Group Services and System Aspects; IP Multimedia (IM) Subsystem—Stage 2 (Release 5)," 3GPP TS 23.228 V5.0.0 (Apr. 2001).

*Primary Examiner* — Hong Cho
(74) *Attorney, Agent, or Firm* — Volpe and Koenig, P.C.

(57) ABSTRACT

An improved data communication network including a wireless link for accessing, from an end user machine, objects in a selected web page retrievable from an Internet server by means of suitable request messages is described. The wireless link includes a subscriber unit coupled to the end user machine and a base station coupled to the server. Web page data packets retrieved from the server with the use of the request messages are intercepted and locally stored in a gateway unit on the base station side of the wireless link. The gateway unit generates, from the retrieved web page data packets, additional request messages suitable for retrieving, from the server, object data packets corresponding to the objects on the selected web page. Such retrieved object data packets are also stored in the gateway unit. At least a portion of the stored object data packets, together with the stored web page data packets, are selectively released for transmission in bundled form over a single assigned channel on the wireless link. Such transmitted object data packets are locally stored in an additional gateway unit on the subscriber unit side of the wireless link, while the transmitted web page data packets are forwarded to the end user machine. The end user machine re-generates the object retrieval request messages, which in turn are used to directly retrieve the object data packets locally stored in the additional gateway without the necessity of again traversing the wireless link.

4 Claims, 6 Drawing Sheets

U.S. PATENT DOCUMENTS

| | | | |
|---|---|---|---|
| 6,941,338 B1 * | 9/2005 | Madsen | 709/203 |
| 7,328,267 B1 * | 2/2008 | Bashyam et al. | 709/227 |
| 7,844,813 B2 * | 11/2010 | Henson et al. | 713/150 |
| 2001/0021197 A1 | 9/2001 | Foore et al. | |
| 2001/0030970 A1 * | 10/2001 | Wiryaman et al. | 370/401 |
| 2002/0026491 A1 | 2/2002 | Mason et al. | |
| 2002/0032853 A1 | 3/2002 | Preston et al. | |
| 2002/0097850 A1 * | 7/2002 | Schemers et al. | 379/90.01 |
| 2002/0101839 A1 | 8/2002 | Farley et al. | |

* cited by examiner

METHOD AND APPARATUS FOR IMPROVING UTILIZATION EFFICIENCY OF WIRELESS LINKS FOR WEB-BASED APPLICATIONS

RELATED APPLICATION(S)

This application is a continuation of U.S. application Ser. No. 09/876,843, filed Jun. 6, 2001 now U.S. Pat. No. 6,947,444. The entire teachings of the above application(s) are incorporated herein by reference.

BACKGROUND OF THE INVENTION

This invention relates to data communication networks including a wireless link for transmitting data packets between an end user machine and a server, and more particularly to arrangements of this type for accessing Internet content such as server-based web pages from the end user machine.

An end user machine in such an arrangement utilizes a web browser to request, retrieve and locally display web pages, each of which consists of many objects of small size. The TCP protocol is typically used to transport this data over the wireless link between the end user machine (or client) and the Internet server to which the web page request is directed. The wireless link includes a subscriber unit which is coupled to the end user machine, and a base station which is coupled to the server and is in radio communication with the subscriber unit.

The use of the TCP protocol in such connections through a wireless environment has several disadvantages. Such environment is especially subject to packet losses that are most often caused by signal loss and temporary disconnects, resulting in missing or delayed acknowledgment signals between the end user machine and the server. TCP frequently interprets such wireless packet loss as network congestion, even when no network congestion is present. This is true whether packets are destined for the end user machine or the server. This increases the likelihood that the applicable TCP protocols at either end of the network connection will invoke congestion avoidance/slow start modes at the server. In addition, each of the small objects on a retrieved web page must be transported over one or more separate TCP connections, which severely burdens the capacity allocation requirements on the wireless link. Consequently, the TCP connections never reach their optimum transmission speeds, and the wireless network resources are very inefficiently used.

These problems are especially acute in the case where an end user machine is requesting access to web pages that are housed on an Internet server. A separate connection from the client to the server has to be established through the wireless link not only when the client sends a web page request but also when the client wants to retrieve the plurality of objects that typically are contained within the web page. Each of the requests for a web page and a separate object must be responded to over the connection by the web server, and since typically small amounts of data are involved each time in going across the wireless interface, an especially poor allocation of system resources is present.

SUMMARY OF THE INVENTION

These problems are significantly minimized with the use of a web cache proxy gateway arrangement of the present invention, in which first and second proxy gateways are respectively associated with the subscriber unit and the base station on opposite sides of the wireless link. In an illustrative embodiment the first gateway establishes, with the end user machine, a first TCP connection that replicates an end-to-end connection between the end user machine and an Internet server housing a web page to be retrieved. In like manner, the second gateway unit establishes, with the server, a second TCP connection that replicates a similar end-to-end connection. The separated proxy TCP termination points thus presented by the gateways to the associated terminal machines allow the intervening wireless link itself to be separately optimized with a wireless protocol without the necessity of transporting data in TCP format through such link.

The second gateway makes a web page access request to the server on behalf of the end user machine, and intercepts the resulting web page data packets from the server. The second gateway generates, from the intercepted web page data packets, request messages for all the objects contained in the web page. The second gateway transmits such locally generated object requests to the server, and locally stores the retrieved object data messages. The locally stored web page messages, together with at least a portion of the locally stored object data messages, are selectively transmitted to the first gateway in bundled form over the wireless link using a single connection.

The first gateway locally stores the selectively transmitted object data messages, and forwards the web page data message to the end user machine. The end user machine can then retrieves such locally stored object data messages with the use of object data requests derived from the forwarded web page data message. This eliminates the necessity of repetitively assigning separate channels over the wireless link to retrieve each of such objects on the server side of the link.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The invention is further illustrated in the following detailed description taken in conjunction with the appended drawing, in which.

DETAILED DESCRIPTION OF THE INVENTION

A description of preferred embodiments of the invention follows. While this invention has been particularly shown and described with references to preferred embodiments thereof, it will be understood by those skilled in the art that various changes in form and details may be made therein without departing from the scope of the invention encompassed by the appended claims.

Figure 1:
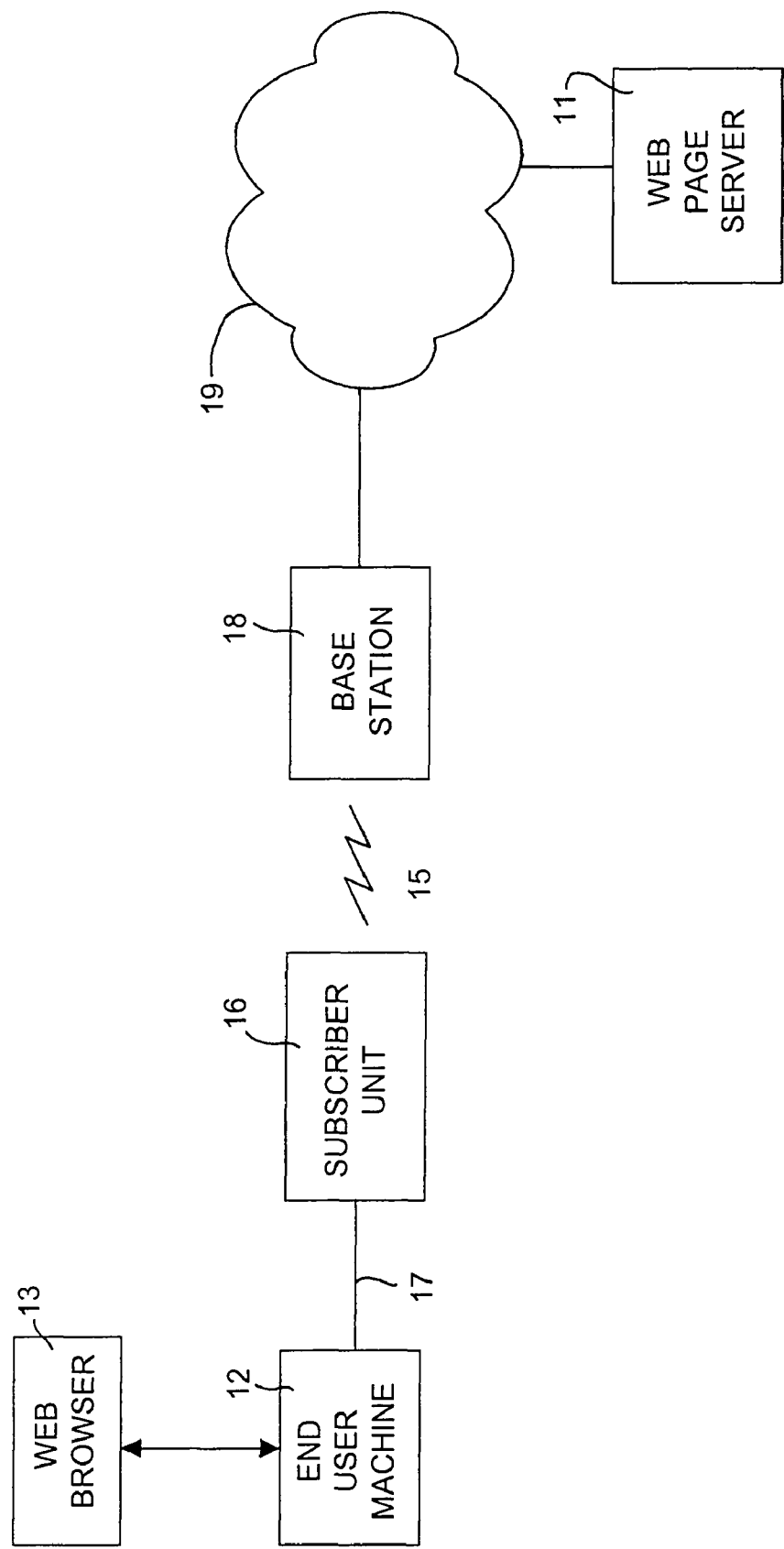
FIG. 1 is a block diagram of a wireless data communication system having facilities for efficiently accessing server-based web pages from an end user machine.

Referring to FIG. 1, a conventional Internet server 11 is depicted for providing content in the form of web pages which may be accessed by an end user machine 12 with the use of a conventional web browser application 13. Access to the server from the machine 12 is accomplished through a data packet communication system 14. The system 14 includes a wireless link 15 having at one end a subscriber unit 16, which typically includes a wireless modem and associated components. The subscriber unit is coupled to the end user machine through a direct connection or via a local area network 17, which may be a conventional Ethernet connection. The end user machine may be a laptop computer, a portable computer, a personal digital assistant, or the like, which may be moved form place to place.

The subscriber unit 16 is in radio communication with a base station 18 on the server side of the wireless link 15. The base station 18 may be conventionally coupled to the server 11 through the Internet represented at 19.

The web pages housed on the server 11 are typically constructed in accordance with HTML or similar protocols, and are accessed from the end user machine 12 over the network 14 utilizing the web browser 13 to generate the applicable HTTP web page request messages. Each web page is typically composed of many objects. The objects, in turn, are separately accessed by means of separate HTTP object request messages generated by the browser 13. Such objects may be represented, e.g., by hyperlinks on the retrieved web page.

It has been generally necessary for the base station 18 to assign a separate channel(s) over the link 15 to establish a connection by which the end user machine 12 can transmit each HTTP object request message over the network 14 to the server 11, and retrieve object data packets representing the requested object. Each such separate connection, which employs a transport protocol such as TCP, is conventionally set up by utilizing suitable application software (not shown) associated with the machine 12 to generate TCP connection request packets bearing the IP destination address of the server 11. Once a TCP connection is established, retrieval of a requested web page or one of its associated objects, as the case may be, may be carried out in a bi-directional manner using convention TCP protocols.

Successive bytes in the transmitted packets from the sending machine (the end user machine 12 or the server 11) will, in further accordance with applicable TCP protocols, trigger successive acknowledgment signals from the receiving machine at the other end of the established TCP connection. The acknowledgment signals are transmitted to the sending machine over the same TCP connection. As is well known, use of the TCP protocol for transmission over a wireless link leads to many inefficiencies and loss of throughput because of TCP congestion control mechanisms that are erroneously triggered when the protocol interprets the inevitable packet losses and delays on the wireless link as congestion on the network. In addition, the necessity of constantly assigning wireless channels for each of the many object and web page requests and responses necessary in a typical web browser session, together with the high overhead required when transmitting, over the wireless link, relatively large TCP headers in the packets representing such requests and responses, result in inefficient transfer of data and utilization of resources on the network.

Figure 2:
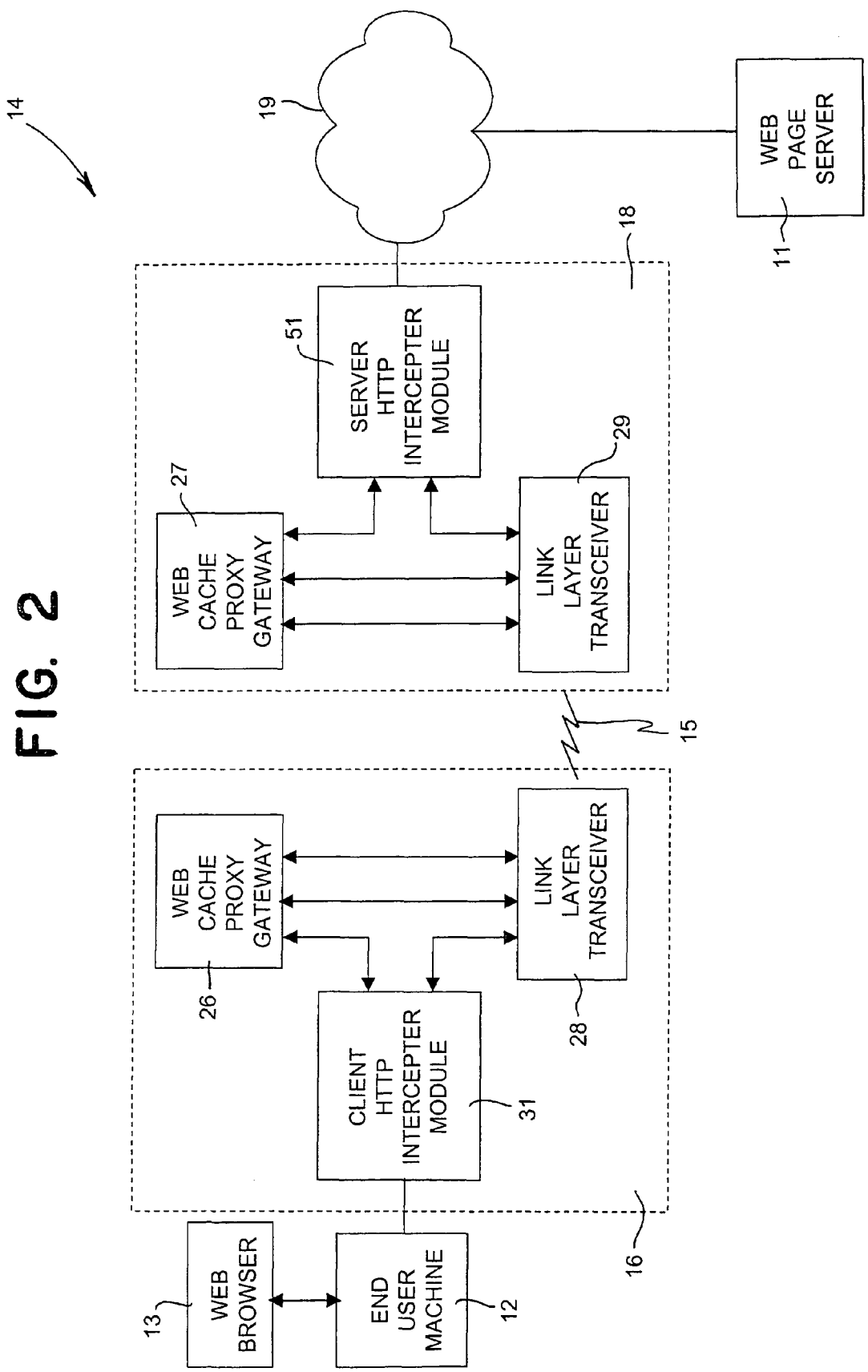
FIG. 2 is a block diagram of a wireless data communication system of the type shown in FIG. 1 but incorporating the web cache proxy gateway arrangement of the invention.

In accordance with the invention, such problems are greatly reduced with the use of the modified data communication system 14A illustrated in FIG. 2. A pair of web cache proxy gateways 26 and 27, to be described in more detail below, are associated with the subscriber unit 16 and the base station 18, respectively. In the arrangement shown, the gateway 26 is represented as being incorporated in the subscriber unit 16, but such gateway may also be a separate unit associated with, and located on the same side of the wireless link 15 as, the subscriber unit 16. In like manner, the gateway 27 is shown as an integral part of the base station 18, but it may be alternately embodied as a separate unit associated with, and located on the same side of the wireless link 15 as, the base station 18. A pair of conventional link-layer transceivers 28 and 29 are also included in the subscriber unit 16 and the base station 18, respectively, and constitute the end points of the wireless link 15.

In order to establish a TCP session with a remote machine over the network 14A, the end user machine 12 typically utilizes TCP connection request packets bearing the IP destination address of such remote machine. Such connection request packets are transmitted over the LAN connection 17 to the subscriber unit 16, where they are intercepted by a client HTTP intercept module 31.

If the connection request packets detected by the module 31 bear the TCP port for HTTP traffic, together with an associated HTTP retrieval request that is illustratively destined to the Internet address of the server 11, such retrieval request packets are directed to the gateway unit 26 from the intercept module 31. Otherwise, the packets are diverted by the module 31 to the transceiver 28, where they are directed over the wireless link 15 and the transceiver 29 to their intended destination (not shown).

With respect to the HTTP retrieval request packets directed to it from the module 31, the gateway 26 is arranged to function as a local TCP end-point for the connection requested by the machine 12 in the manner described in applicant's copending application Ser. No. 09/850,531, filed May 7, 2001, entitled "Dual Split Proxy Gateway for Improving Throughput Performance Over a Wireless Interface". (Such co-pending application is assigned to the assignee of the present invention and is incorporated herein by reference.) In particular, the gateway 26 associates the Internet IP address of the server 11 with such end point to provide a replica of a direct TCP connection between the machine 12 and the server 11. As a result, the gateway 26 act as a proxy for the server 11, participating in standard TCP protocol exchanges with the end-user machine 12. This includes the generation of acknowledgment messages both for connection request messages and for subsequent data messages originating at the machine 12. (It will be assumed that the monitor 31 is transparent to packets, including but not limited to such acknowledgment messages, transmitted over such TCP connection in the direction from the gateway 26 to the end user machine 12.)

Figure 3:
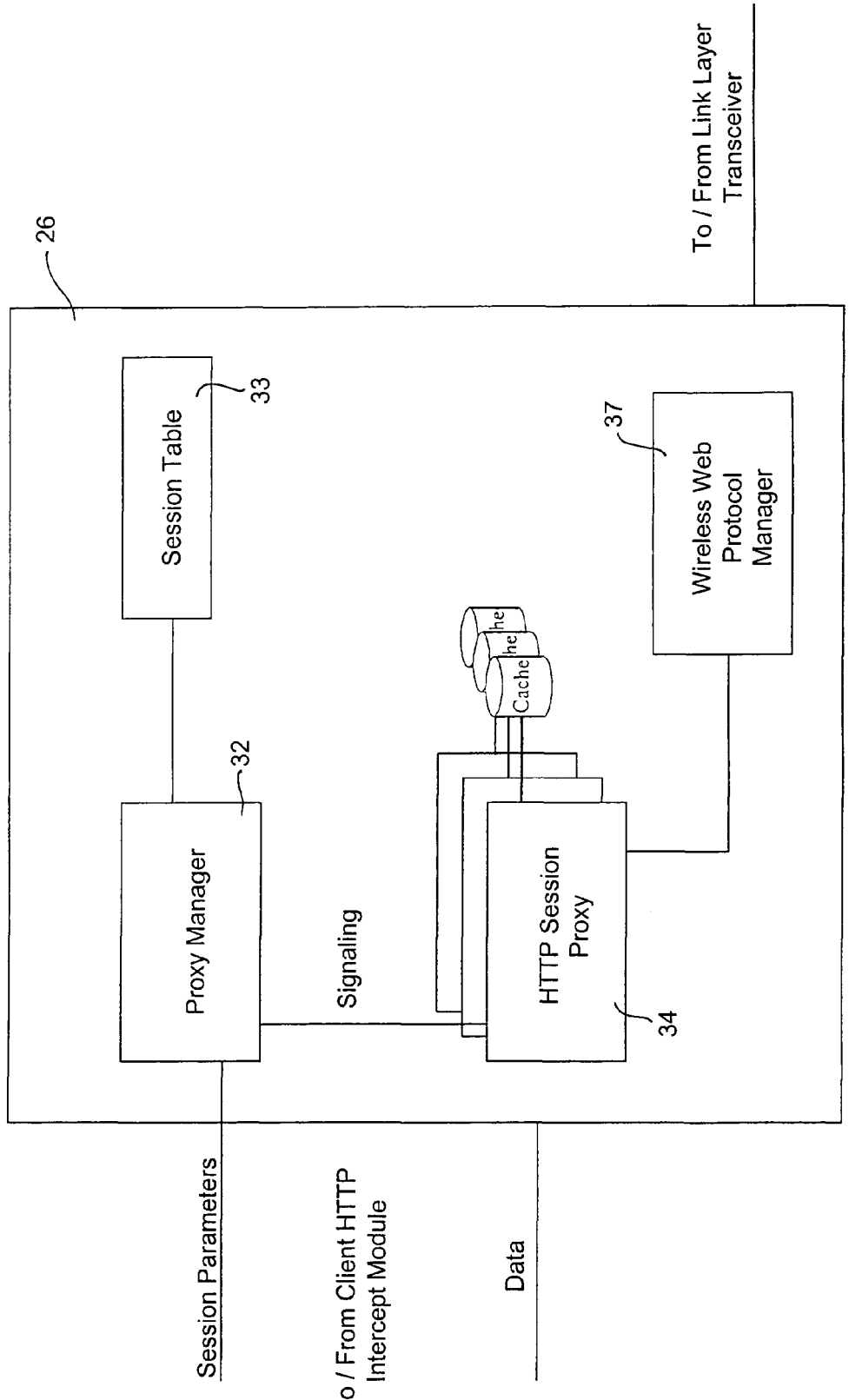
FIG. 3 is a block diagram of an embodiment of a web cache gateway of the present invention as incorporated on the subscriber unit side of the wireless link.

As further set forth in the above-mentioned copending application, the gateway 26 includes facilities for converting the TCP format of the incoming connection request packets from the end user machine 12 to a selected wireless protocol format which may be separately optimized for transmission over the wireless link 15. An illustrative embodiment of such gateway 26 suitable for this purpose is represented in FIG. 3. A proxy manager 32 is coupled to the output of the intercept module 31 to analyze the associated connection information in the TCP headers of the incoming packets. The connection parameters analyzed by the proxy manager 32, which may include source and destination IP addresses and TCP port numbers of the server 11, are mapped with the aid of a session table 33 into a short session identifier. Such information is forwarded from the proxy manager 32 to an HTTP session proxy unit 34 to associate the data coming from the intercept module 31 with the converted data that is to to exit the gateway 26 in wireless protocol format.

Figure 4:
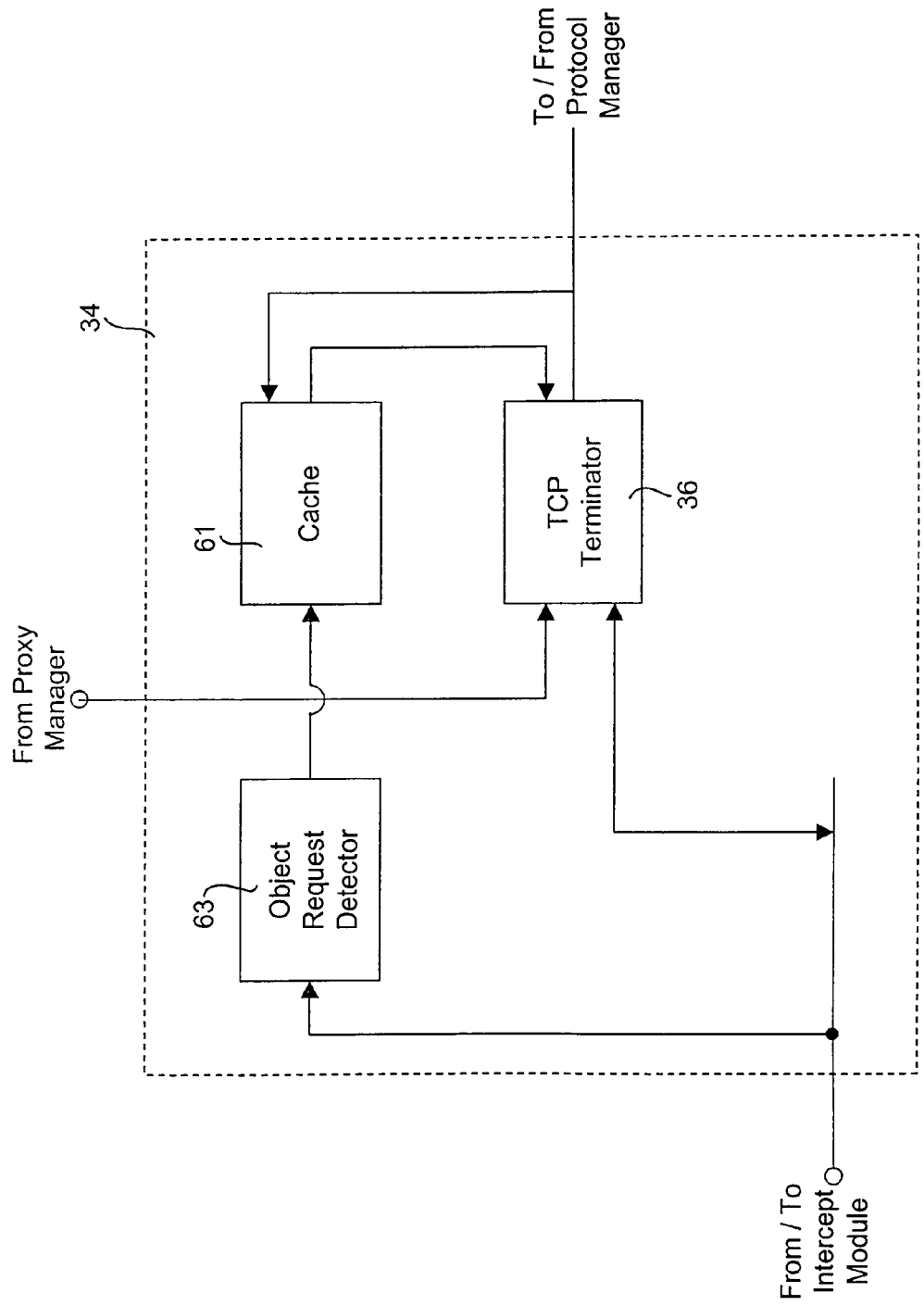
FIG. 4 is a more detailed block diagram of a portion of the gateway of FIG. 3.

As shown in FIG. 4, the proxy unit 34 includes a TCP terminator 36 which is assigned the IP address of the web server 11 by the proxy manager 32. The terminator 36 therefore acts as the proxy TCP end point, on behalf of the server 11, with respect to data arriving from the end user machine 12 through the intercept module 31. The terminator unit 36 removes the TCP framing from the intercepted connection request packets, and transfers the data from such packets (including the HTTP web page retrieval requests), together with the session identifier information from the proxy manager 32, to a wireless web protocol manager 37 (FIG. 3). The manager 37 generates modified connection request packets in which the transferred data from each packet intercepted by the module 31 is encapsulated with a header appropriate for the transmission over the wireless link 15 in a wireless protocol format selected by the manager 37. Such wireless protocol header contains the above-mentioned session identifier, the sequence number assigned to each such packet, and other information that may be necessary to optimally format the packet in accordance with the selected wireless protocol, which may illustratively be a link-layer protocol.

Figure 5:
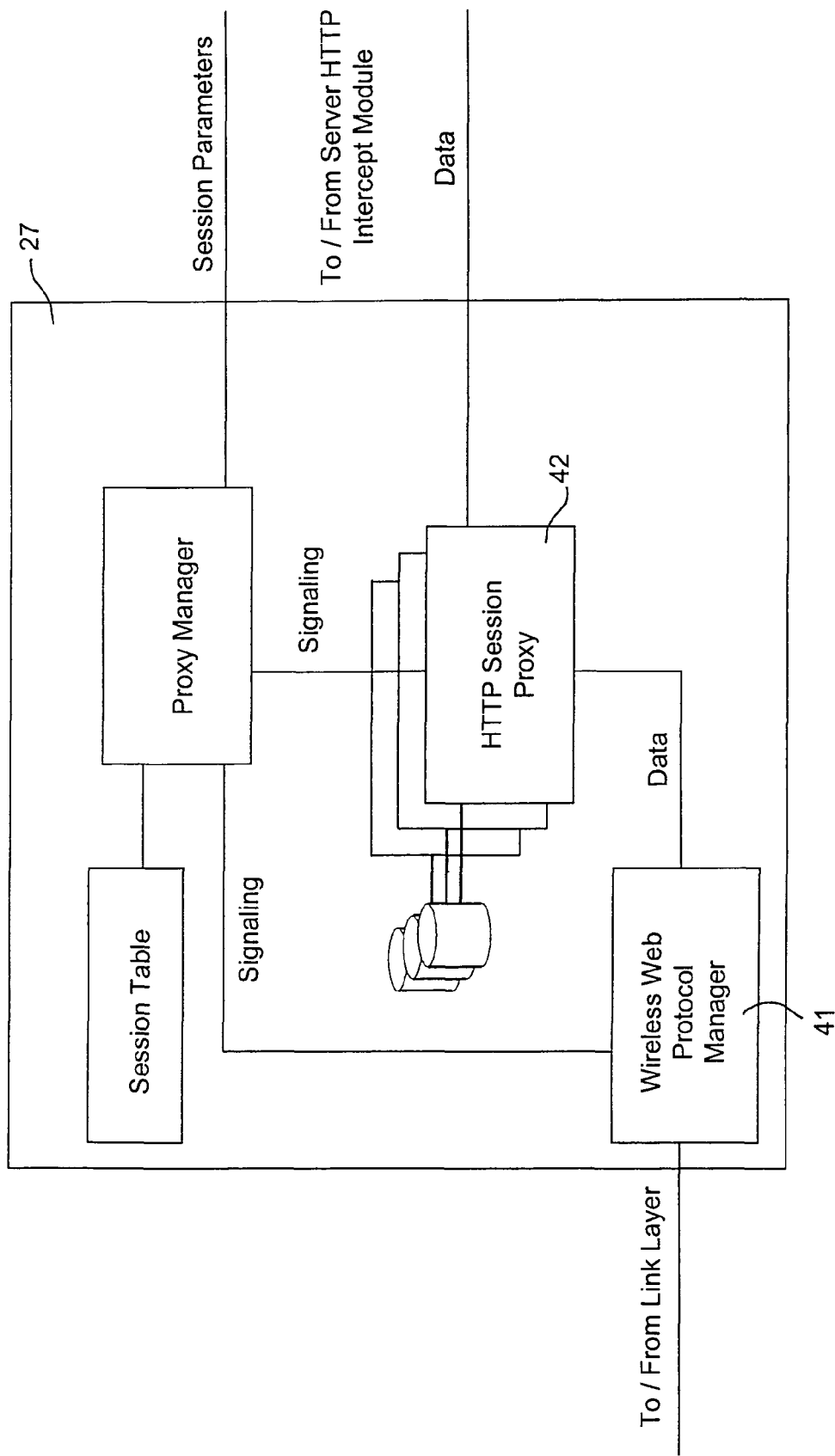
FIG. 5 is a block diagram of an embodiment of a web cache gateway of the invention as incorporated on the base station side of the wireless link.

The gateway 26 (FIG. 2) forwards the modified connection request packets to the transceiver 28, which transmits the modified packets over the wireless link 15 to the gateway 27 via the transceiver 29. In the gateway 27, a second wireless web protocol manager 41 (FIG. 5) extracts the session identifier information from the wireless protocol headers of the incoming modified packets and forwards the modified packets to a second HTTP session proxy unit 42.

A local TCP initiator 43 (FIG. 6) in the proxy unit 42 removes the wireless protocol headers from such packets. It also encapsulates the packet data with TCP headers bearing the IP addresses of the end user machine 12 and the server 11 as derived from the extracted session identifier. This effectively reconstructs the original TCP connection request message from the end user machine 12 (FIG. 2). The gateway 27 is assigned the IP address of the end user machine 12.

The initiator 43 (FIG. 6) forwards the reconstructed TCP connection request packets over the Internet 19 (FIG. 2) to the server 11 to establish a second TCP connection between the gateway 27 and the server. Since the initiator 43 presents the IP address of the end user machine 12 to the server 11, the TCP connection just established between the gateway 27 and the server 11 will be a replica of an end-to-end connection between the end user machine 12 and the server 11. Therefore, like the above-described first TCP connection established between the machine 12 and the gateway 26, the second TCP connection can engage in all standard TCP protocol exchanges as if there were such a direct end-to-end connection between the server 11 and the machine 12. Such exchanges include the generation, at the initiator 43, of acknowledgment messages that would be generated by the end user machine 12 (FIG. 2) in response to the transmission of data packets from the server 11.

Once the system 14A has been configured as just described to establish a dual split proxy connection between the end user machine 12 and the server 11, data packets can flow over such system in a bi-directional manner via the first and second TCP wired connections and the intervening wireless link layer.

When the server 11 receives the reconstructed HTTP web page request message from the gateway 27 (as proxy for the end user machine 12) over the second TCP connection, it generates HTTP web page data packets representative of the requested web page. Such web page data packets are transmitted in TCP format over the Internet 19 to the gateway 27 through a server HTTP intercept module 51, which analyzes the incoming data stream. Any incoming packets that do not represent the web page requested by the end user machine 12 from the server 11 are diverted to the link-layer transceiver 29 without going through the gateway unit 27 in the base station 18. By contrast, the desired web page data packets from the server 11 are routed from the intercept module 51 to the HTTP proxy unit 42 (FIG. 6) in the gateway 27.

In the proxy unit 42, the intercepted web page data message is locally stored in a cache 53 and is separately inspected by a scanner 54 for objects contained in the web page. An object request generator 56 coupled to the output of the scanner 54 creates, for all the objects on the scanned web page, separate HTTP object retrieval messages which are applied in sequence to the server 11 through the above-mentioned second TCP connection via the intercept module 51 and the Internet 19 (FIG. 2). It will be assumed that, in a manner similar to that described above in connection with the client HTTP intercept module 31, the module 51 is transparent to packets transmitted over the second TCP connection in the direction from the gateway 27 to the server 11.

Figure 6:
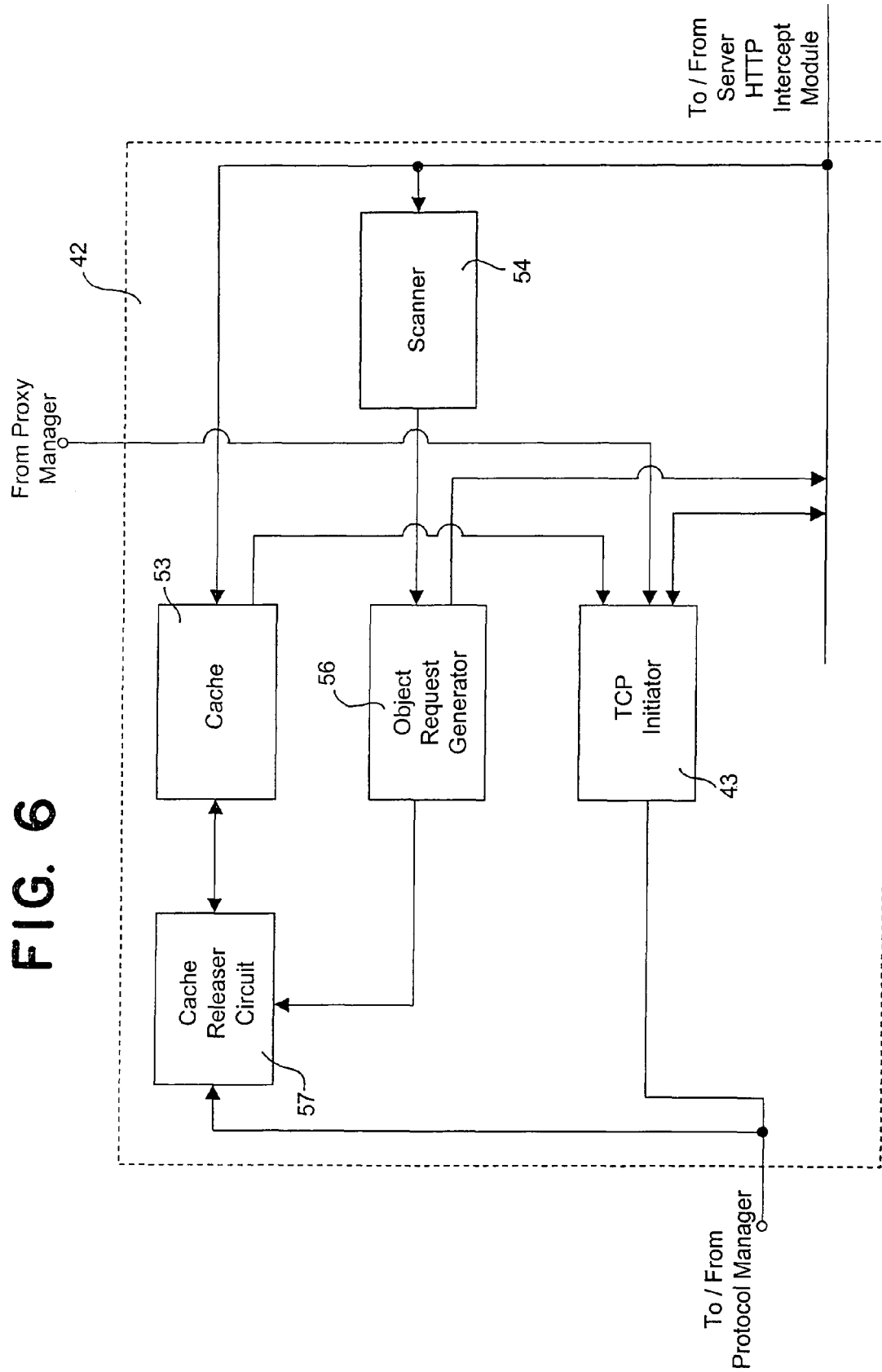
FIG. 6 is a more detailed block diagram of a portion of the gateway of FIG. 5.

In response to each such object retrieval message, the server 11 returns an HTTP object data message over the second TCP connection to the proxy unit 42 (FIG. 6). In further accordance with the invention, such object data messages from the retrieved web page are not immediately transmitted over the wireless link 15 but are instead locally stored in the cache 53. The proxy unit 42 is provided with suitable facilities, represented as a cache release circuit 57, for selectively releasing at least a portion of the locally stored object data messages (together with the locally stored web page data message to which such objects relate) for transmission in bundled form over the wireless link as indicated in the next paragraph. Illustratively, the release circuit 57 may be arranged to monitor the accumulation of packets in the cache (e.g., by tracking the accumulated object data against the corresponding object retrieval request packets from the generator 56), and to direct the cache 53 to release, in bundled form, all the object data associated with the requested web page. Alternatively, the circuit 57 may be arranged to direct the release of the number of object data packets locally stored during an interval selected by an adjustable timer (not shown) in the circuit 57.

Packets released from the cache 53 for transmission over the wireless link are first unencapsulated and applied, via the initiator 43, to the associated protocol manager 41. The protocol manager appends a small wireless protocol header to such unencapsulated data, and transmits the packets as so converted to the gateway unit 26 (FIG. 2) in the subscriber unit 16 through a path that includes the transceiver 29, an assigned traffic channel on the wireless link 15, and the transceiver 28. (It will be understood that if not all of the released data can be sent before such wireless traffic channel is reassigned, then additional transmissions will take place over channel(s) assigned in the future until all of the data is sent.)

Because the locally stored object data messages representing a great deal of web data are transmitted at one time in bundled form over the wireless link, the necessity of continually assigning channel capacity for separate transmissions of individual object and web page requests and corresponding acknowledgment signals over such link is greatly minimized.

When the transmitted object data packets from the gateway 27 are received by the first gateway 26 on the subscriber unit side of the wireless link 15, they are coupled through the protocol manager 37 (FIG. 3) and locally stored in a cache 61 (FIG. 4) in the proxy unit 34. However, the web page data packets that were bundled with such object data packets are not stored. Instead, they are directly applied to the TCP terminator 36, which re-converts the web page data packets from the selected wireless protocol to the TCP protocol. The web page data packets as so reconverted are then sent via the transparent intercept module 31 (FIG. 2) to the end-user machine 12 over the previously established first TCP connection.

Once such web page data packets are received by the end-user machine 12, the end-user machine can retrieve the associated object data packets stored in the cache 61 (FIG. 4) in the HTTP session proxy 34. For this purpose the end user machine, utilizing the browser 13, can scan the web page represented by the received data packets to locally generate HTTP object retrieval request messages identical to the object data retrieval messages that were originally generated on the base station side of the wireless link. Release of the object data packets from the cache 61 may be accomplished with the aid of a detector or other suitable release circuit 63 to which such locally generated object retrieval request signals are applied over the first TCP connection.

It will be appreciated that retrieval of the web data signals in the manner described above may be quickly and efficiently accomplished without the necessity of repetitively requesting wireless resources (e.g. RF traffic channels) to transmit each individual object retrieval request message and object data response message through the wireless link 15.

Preferably, the cache release circuit 57 of FIG. 6 is provided with facilities for preventing the packets locally stored in the cache 53 from being unnecessarily transmitted over the wireless link from the gateway 27 to the gateway 26. This situation could occur, for example, when the subscriber utilizing the end user machine 12 (FIG. 2), after requesting a web page from the server 11, decides to terminate the applicable TCP session, e.g., by transmitting a conventional TCP reset or abort signal over the first TCP connection before receipt of the requested data. When such reset signal arrives at the gateway 26 through the intercept module 31, the terminator 36 (FIG. 4) terminates the first TCP connection, and the protocol manager 37 converts the reset signal into a connection cancellation message in a format suitable for transmission across the wireless link to the second gateway 27. Upon receipt of such message the protocol manager 41 (FIG. 5) in the gateway 27 reconstitutes the TCP reset signal, which is transmitted over the second TCP connection to the server 11 to terminate such connection in a conventional manner. The cancellation message is also applied to the cache release circuit 57 (FIG. 6), which instructs the cache 53 to "dump" its accumulated contents of web page and object data instead of releasing such data to the initiator 43 for format conversion and transmission over the wireless link.

In the forgoing, the invention has been described, in part, in connection with an exemplary embodiment thereof. Many variations and modifications will now occur to those skilled in the art. For example, the first and second TCP connections in the system 14A (FIG. 2) may be set up from the server side of the system 14A, so that the first TCP connection would extend between the server 11 and the gateway 27, and the second TCP connection would extend between the gateway 26 and the end user machine 12. The mechanics of forming such reverse connections will mirror those described above, except that the end point of the first TCP connection as presented to the server 11 would be implemented by a second TCP terminator (not shown) in the gateway 27, while the starting point of the second TCP connection as presented to the end user machine 12 would be implemented by a TCP initiator (not shown) in the gateway 26. Also, it will now be evident that many of the advantages of the invention resulting from selectively transmitting web page object messages in bundled form over a single assigned channel on the wireless link may be achieved whether or not the system includes the double-split TCP connection specified in the illustrative embodiment. It is accordingly desired that the scope of the appended claims not be limited to or by the specific disclosure herein contained.

What is claimed is:

1. A method for transmitting web pages over a wireless link, comprising:
   receiving a modified connection request packet at a wireless base station;
   reconstructing a connection request packet from the modified connection request packet;
   transmitting the reconstructed connection request packet to a web server;
   intercepting web page data at the wireless base station, wherein the web page data is based on the reconstructed packet request;
   locally generating at the wireless base station, from the intercepted web page data, object retrieval requests corresponding to objects within a selected web page;
   transmitting the locally generated object retrieval requests to a web server to retrieve the corresponding objects;
   locally storing, at the base station site, the retrieved web page data and the retrieved objects; and
   selectively transmitting the locally stored web page data and at least a portion of the locally stored objects in bundled form to a subscriber unit connected to the wireless link.

2. A method as defined in claim 1, selectively transmitting includes transmitting all of the locally stored objects.

3. A method as defined in claim 1, wherein selectively transmitting includes transmitting a number of locally stored objects stored during a selected time interval.

4. A method as defined in claim 1, further comprising locally storing the selectively transmitted objects on the subscriber unit side of the wireless link for subsequent retrieval.

* * * * *